United States Patent
Henderson

[15] 3,659,487
[45] May 2, 1972

[54] PORTABLE MANUALLY OPERABLE CUTTING MACHINE FOR ROLLED SHEET MATERIAL

[72] Inventor: Charles A. Henderson, Appleton, Wis.
[73] Assignee: Kimberly-Clark Corporation, Neenah, Wis.
[22] Filed: Mar. 30, 1970
[21] Appl. No.: 23,606

[52] U.S. Cl............................83/447, 83/465, 83/482, 83/485, 83/563, 83/649, 242/129.6
[51] Int. Cl............................................B26d 1/20
[58] Field of Search..............83/649, 650, 485, 465, 447, 83/455, 563, 482; 242/129.6, 68, 58.6

[56] References Cited

UNITED STATES PATENTS

| | | | |
|---|---|---|---|
| 527,879 | 10/1894 | Potter | 242/58.6 |
| 1,984,712 | 12/1934 | Wallsten | 242/129.6 |
| 760,800 | 5/1904 | Nice | 83/485 X |
| 3,540,337 | 11/1970 | Gardner | 83/649 X |
| 589,577 | 9/1897 | Robinson et al. | 83/447 X |
| 1,708,585 | 4/1929 | McCarthy | 83/485 X |
| 2,413,544 | 12/1946 | Carpenter | 83/455 X |
| 2,683,489 | 7/1954 | Jackman | 83/485 |
| 2,599,601 | 6/1952 | Axworthy | 83/485 |
| 3,358,540 | 12/1967 | Hall | 83/649 X |
| 3,529,504 | 9/1970 | Hagerty et al. | 83/649 X |

Primary Examiner—Frank T. Yost
Attorney—Wolfe, Hubbard, Leydig, Voit & Osann, Ltd.

[57] ABSTRACT

A portable, manually operable, cutting machine for rolled sheet material includes a frame having a pair of horizontally spaced parallel inclined ramps which aid in loading a roll of material into the machine. Material is fed from the roll over a shelf having a cutter backing bar, and is held in position by friction brushes. A cutting carriage, with a rotatable disk cutter, is rocked downward into contact with the backing bar to cut the material when the carriage is moved across the shelf.

9 Claims, 4 Drawing Figures

Patented May 2, 1972

INVENTOR.
CHARLES A. HENDERSON,
BY
Wolfe, Hubbard, Leydig, Voit & Osann
ATTORNEYS.

Patented May 2, 1972
3,659,487
2 Sheets-Sheet 2
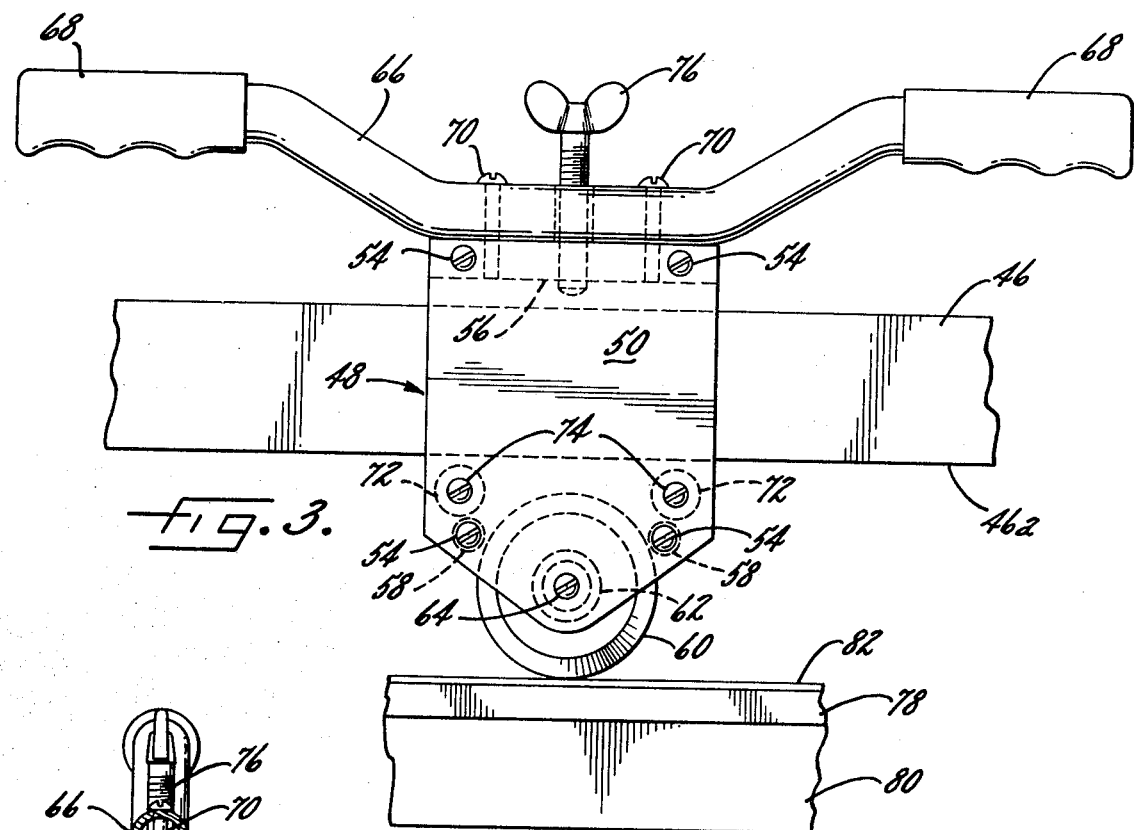
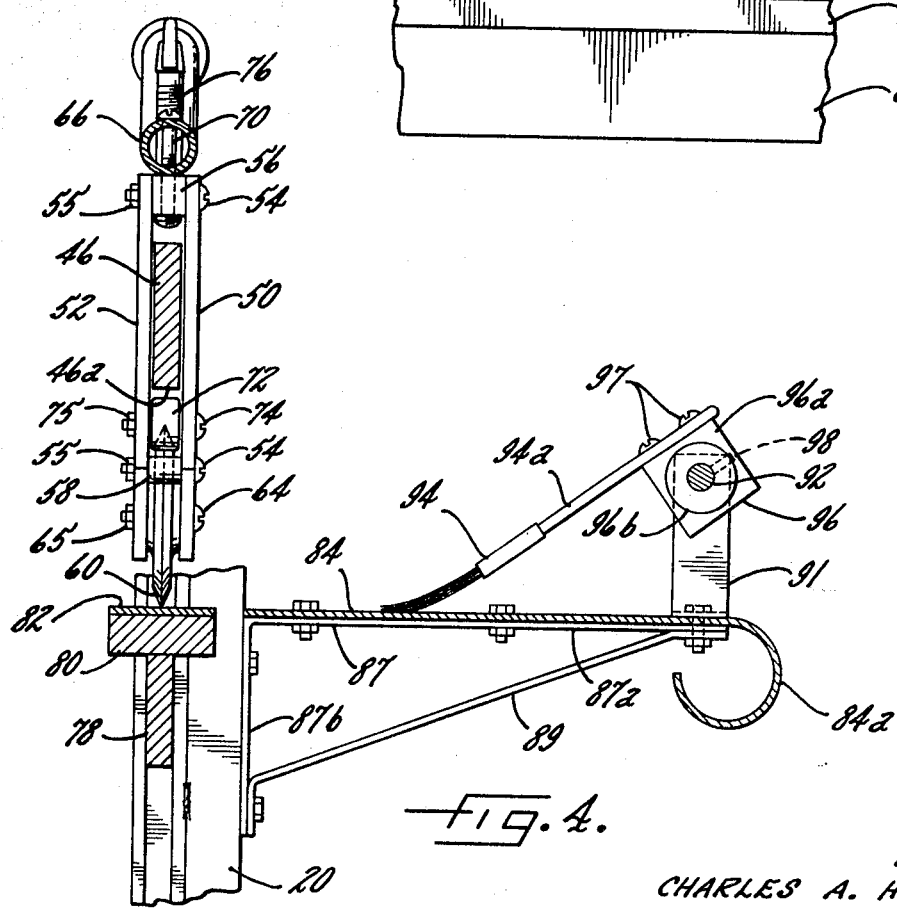
INVENTOR.
CHARLES A. HENDERSON,
BY
Wolfe, Hubbard, Leydig, Voit & Osann
ATTORNEYS.

PORTABLE MANUALLY OPERABLE CUTTING MACHINE FOR ROLLED SHEET MATERIAL

This invention relates to portable cutting machines, and more particularly concerns the provision of a machine for cutting lengths of material from a roll of the same. The invention has special, although not exclusive, utility in dispensing lengths of nonwoven fabric for use as restaurant table cloths, hospital bed sheets, and the like.

Disposable nonwoven fabric material, as used by restaurants for table cloths and by hospitals for bed sheets, is often supplied in roll form. In cutting sheeting from the roll, it is necessary to ensure a clean, straight, cut across the width of the sheet. Those very characteristics of nonwoven fabric that make them so valued, particularly their high tensile and tear strength, requires that cutting be done with a sharp implement. Knives, paper cutters, and scissors are effective, but somewhat hazardous and at all events awkward when cutting wide sheeting. More elaborate cutting devices often exchange complexity, cost, convenience, and portability factors in a manner suitable only for large-scale consumers.

An object of the invention is to provide a simplified yet effective cutting machine for cutting sheets of material from relatively large rolls of such material.

A further object is to provide such machine which excises the sheet perpendicularly to its length, and which leaves the sheet with a clean edge.

Another aspect, a further object of the invention is to provide a cutting device which is capable of use by one operator; which can cut roll material of different widths and at variously predetermined lengths; and which is entirely safe in operation.

Still a further object is to provide a cutting machine which permits a facile insertion and removal of roll-form sheet material.

A more particular object is to provide a sheet-cutting device that remains spaced away from the sheet to permit the sheet to be advanced over the cutting area, and which descends onto the sheet when cutting commences. A related object is to provide such device which can be readily immobilized for safe transport.

Other objects and advantages of the invention will be apparent from the following detailed description, taken in connection with the accompanying drawings in which:

FIG. 3 is an elevational view of a manually reciprocable carriage of the cutting machine of FIG. 1, portions of a mounting bar and a cutter backing bar also being shown; and FIG. 4 is a fragmentary sectional view taken in the direction of arrows 4—4 of FIG. 1.

Figures 1, 2:
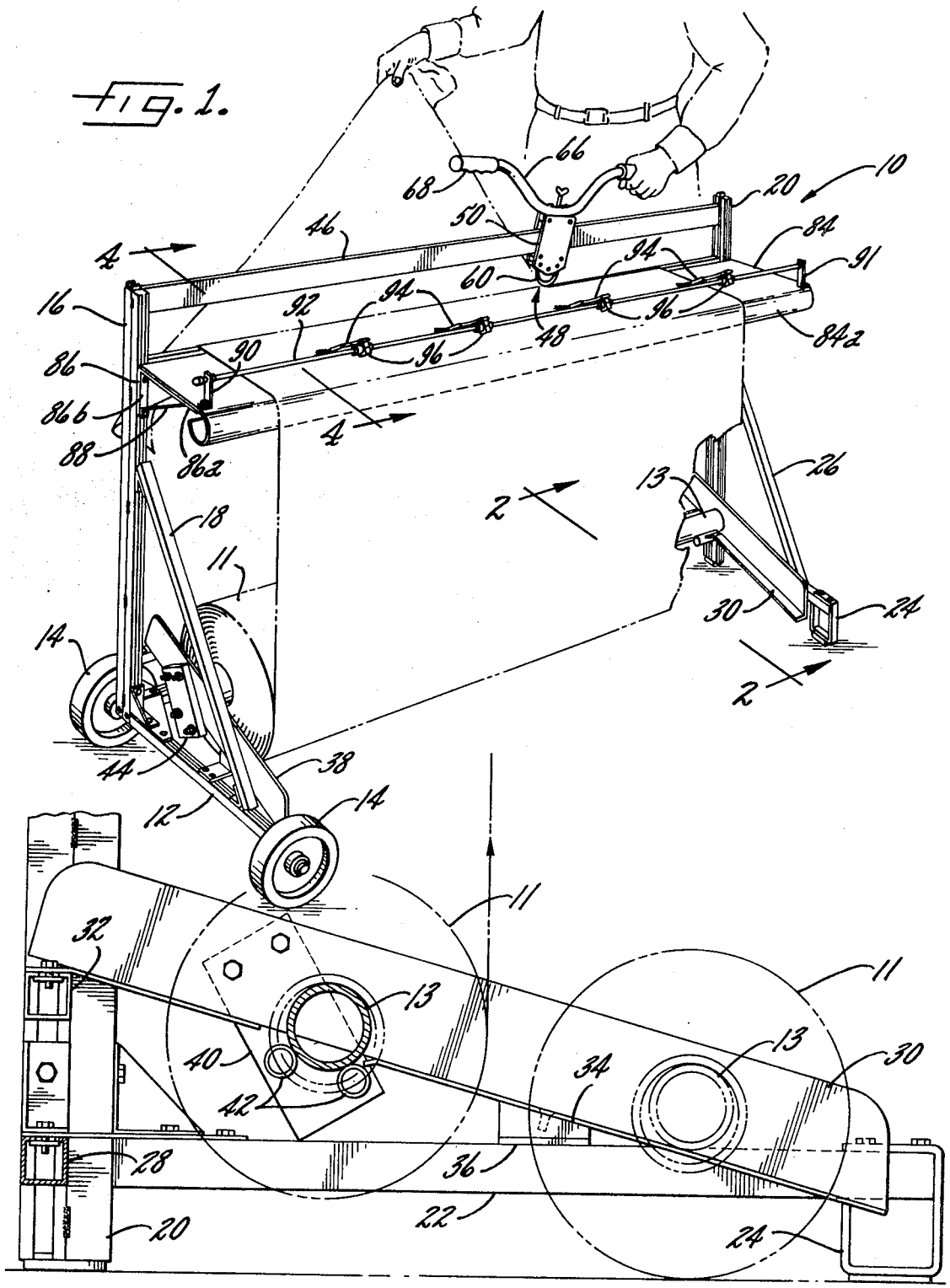
FIG. 1 is a perspective view of a cutting machine constructed in accordance with the invention.
FIG. 2 is a fragmentary sectional view taken in the direction of arrows 2—2 of FIG. 1.

While the invention will be described in connection with certain preferred embodiments, it will be understood that it is not intended to limit the invention to these particular embodiments. On the contrary, it is intended to cover all alternatives, modifications, and equivalent arrangements as may be included within the spirit and scope of the invention.

Turning now to the drawings, FIG. 1 illustrates in perspective view a preferred embodiment of the invention. A portable cutting machine 10 includes a frame member 12 carrying a roll 11 of sheet material (shown in phantom) which is to be severed by the cooperative action of a cutting carriage 48 and a flat cutting surface (best shown as wear plate 82 in FIG. 4). Sheet material from the roll 11 is manually transported over a curved edge portion 84a of a shelf 84, where it is held in position by a series of paper guiding brushes 94 which bear against the surface of the material and frictionally engage the material with the top of the shelf 84.

With further reference to FIG. 1, a machine 10 constructed in accordance with the invention includes a horizontal frame member 12 at one end of the machine. The frame member 12 is supported at one end on a pair of wheels 14. A vertical frame member 16 is secured to the frame member 12 adjacent one of the wheels 14, and an angularly extending brace 18 is secured at opposite ends respectively to the frame members 12 and 16. Framework at the other end of the machine is similar, but rests on the floor without wheels. Thus, at the other end of the machine, a vertical frame member 20 rests on the floor, and a horizontal frame member 22 (FIG. 2) is secured at one end to the frame member 20 and supported at the other end by a foot member 24. An angularly extending brace 26 is secured at opposite ends respectively to the frame members 20 and 22. The frame members 16 and 20 are connected adjacent their lower ends respectively to opposite ends of a horizontal frame member 28 shown only in section in FIG. 2.

To facilitate insertion of a heavy roll of material 11, an inclined ramp member 30 of generally L-shaped cross section is secured adjacent an upper end to a support member 32 on the frame member 20. An intermediate portion of the ramp member 30 is secured to a wedge 34 supported by a bracket 36 secured to the frame member 22. A complementary ramp member 38 is similarly supported on the frame members 12 and 16.

When a roll of material 11, wound on a first core, is to be loaded into the machine 10, a second core 13 of smaller diameter but greater length than the first core is inserted in the first core. Opposite ends of the second core 13 are then placed in engagement respectively with the ramp members 30 and 38, and the roll is rolled up the ramp members (see FIG. 2) on the second core 13 until the second core comes to rest between the pair of rollers 42 on the block 40 and between a similar pair of rollers on the block 44. These rollers 42, 44 are carried on a block 40 secured to the ramp members 30, 38, a portion of which is cut away adjacent the rollers 42.

After insertion of the roll 11 onto the machine 10, the material is drawn manually over a shelf 84 and presented to a wear plate 82 (FIG. 1). The table or shelf 84 having a curved edge portion 84a (FIGS. 1 and 4) is secured to the frame members 16 and 20 in horizontally spaced, parallel, flush relationship to the wear plate 82 by a pair of generally L-shaped brackets 86 and 87 having long leg portions 86a and 87a secured respectively to opposite end portions of the undersurface of the shelf 84 and short leg portions 86b and 87b secured respectively to the frame members 16 and 20. The shelf 84 is further braced by a pair of braces 88 and 89 each secured adjacent opposite ends respectively to the free end portions of a respective one of the brackets 86 and 87. A pair of generally L-shaped brackets 90 and 91 is secured to the upper surface of the shelf 84 adjacent the curved edge portion 84a and respectively adjacent opposite ends of the shelf. A rod 92 is supported adjacent opposite ends respectively in the brackets 90 and 91.

Material from the roll 11 is held in position on the shelf 84 by several paper guiding brushes 94 (FIGS. 1 and 4) secured to the rod 92 in spaced relationship to each other longitudinally of the rod. These brushes 94, of stiff bristle or similar material, bear down on the material as it rests on the shelf, and form an acute angle with the shelf 84 in the direction of the roll 11 (FIG. 1). Thus, the material passes easily across the shelf in a direction toward the wear plate 82, but is prevented from sliding back by the ends of the bristles; otherwise stated, friction is less in a direction toward the wear plate 82 than in the opposite direction.

The handle 94a of each brush is secured to a generally square portion 96a of a mounting block 96 by a pair of screws 97. The mounting blocks 96 are mounted on the rod 92 in angularly adjustable relationship thereto. Cylinder portions 96b extend outwardly respectively from opposite sides of the square portion 96a of each mounting block 96. Each cylindrical portion 96b of a mounting block 96 has a set screw 98 for securing the mounting block to the rod 92.

For the actual cutting, a cutter carriage 48 is used. This is reciprocally mounted on a mounting bar 46, secured adjacent opposite ends respectively to the frame members 16 and 20, and includes a pair of plate members 50 and 52 (see FIGS. 3 and 4) secured to each other in spaced-apart relationship by a plurality of bolts 54 and nuts 55. A spacing bar 56 is secured between upper edge portions of the plate members 50 and 52 by an upper pair of the bolts 54 and nuts 55. Each of a lower pair of the bolts 54 has a spacer 58 mounted thereon between the plate members 52. The spacing bar 56 and spacers 58 are slightly wider than the thickness of the mounting bar 46, allowing the carriage 48 to be pushed along the mounting bar 46 with little resistance and a minimum of play.

In keeping with the invention, the cutter carriage 48 includes provisions for mounting the carriage so that a cutting force is applied from the carriage cutter 60 to the wear plate 82 (FIGS. 3 and 4) when leverage is applied on the carriage handle bar 66 (FIGS. 1 and 3). To this end, a pair of roller bearings 72 (FIGS. 3 and 4) is provided on the carriage 48 to contact and roll along the lower edge of the mounting bar 46 when the operator bears down on the handle bar 66.

In keeping with this aspect of the invention, the carriage 48 (FIGS. 3 and 4) includes a journaled disk-shaped cameron-type cutter 60 rotatably mounted on a ball bearing 62 secured between the plate members 50, 52 by a bolt 64 and nut 65, and a handle bar 66 having a pair of hand grips 68 secured to the spacing bar 56 of the carriage 48 by a pair of screws 70 threaded into. A pair of horizontally spaced ball bearings 72 is secured between the plate members 50 and 52 respectively by a pair of bolts 74 and nuts 75. The ball bearings 72 are normally spaced away from but relatively close to a lower edge surface 46a of the mounting bar 46.

The carriage 48 may be raised to a non-cutting position and secured against movement along the mounting bar 46 when not in use by a set screw 76 extending with clearance through the handle bar 66 and threaded through the spacing bar 56. Tightening the set screw 76 raises the carriage 48 until the ball bearings 72 contact the mounting bar 46.

To provide a cooperative cutting surface for the cameron-type disk cutter 60, a flat, hardened steel, wear plate 82 (FIGS. 3 and 4) is mounted on the machine 10 (FIG. 1) on a plane substantially parallel to, and level with, the shelf 84. The wear plate 82 is affixed to a generally T-shaped brace composed of a horizontal bracing bar 80 and a vertical backing bar 78, the latter secured to the frame members 16, 20 (FIG. 1) directly below the mounting bar 46 (FIG. 4).

Cutting a sheet is quite simple. Material is advanced across the shelf 48 a desired predetermined length beyond the plane of the cutter 60, and the handle bar 66 (FIG. 1) is depressed and advanced along the mounting bar 46. When the carriage 48 is in operative position, that is, when the set screw 76 has been loosened and the carriage lowered until the cutter 60 touches the wear plate 82, pressure is applied to the paper to be cut by the cutter 60 by either raising or lowering either of the hand grips 68 on the handle bar 66 to tilt the carriage until one of the ball bearings 72 bears against the surface 46a of the mounting bar 46. Leverage from the bar applies a concentrated cutting pressure between the cutter 60 and the wear plate 82. The above sequence may then be repeated to cut off additional sheets.

Various modifications may be made in the structure shown and described without departing from the spirit and scope of the invention as set forth in the appended claims.

I claim:

1. A cutting machine for rolled sheet material comprising, in combination:
    a frame including a support for a roll of sheet material and a shelf and wear plate adjacent said roll support for supporting sheet material unwound from said roll;
    a mounting bar carried by said frame, fixed against upward movement and positioned in parallel spaced relation with and extending transversely across said wear plate from one side of the frame to the other;
    a carriage manually reciprocable along said mounting bar, said carriage including:
        a cutter on the underside of said carriage engaging said wear plate for cutting said sheet material when interposed therebetween,
        an operating handle attached to the upper portion thereof and providing a lever arm extending generally parallel to said mounting bar toward one side of the frame for both manually moving the carriage and applying cutting pressure, and
        a roller bearing beneath and spaced from said mounting bar so that said carriage and cutter may be bodily raised to permit introduction and passage of material unwound from the roll between the cutter and wear plate, said bearing being positioned on the opposite side of said cutter from said handle to be raised upwardly by a reaction against the cutter from said wear plate and into contact with said fixed mounting bar when an operator bears down on said operating handle to tilt said carriage thereby enabling the operator to exert concentrated cutting pressure against said sheet material interposed between said cutter and said wear plate while moving the carriage.

2. A cutting machine as defined in claim 1 wherein the cutter is disk-shaped.

3. A cutting machine as defined in claim 2 wherein the cutter is ball bearing mounted.

4. A cutting machine as defined in claim 1 wherein said shelf includes a wear plate positioned beneath said mounting bar for engagement by the cutter and extending generally the full length thereof, the upper surface of said wear plate constituting an extension of said shelf.

5. A cutting machine as defined in claim 1 wherein said shelf includes a plurality of paper guiding brushes mounted thereon, said brushes being angularly disposed relative to said shelf and in sufficient pressure contact with said shelf means whereby the bristles of the brushes are deflected, such that friction tending to restrict movement of said sheet material is substantially less in the direction toward said carriage than in the opposite direction.

6. A cutting machine as defined in claim 1 wherein the carriage includes a pair of plate members secured to each other in spaced-apart relationship and disposed respectively on opposite sides of said mounting bar.

7. A cutting machine as defined in claim 1 wherein said carriage includes a second handle attached to the upper portion thereof and extending generally in the opposite direction to said operating handle, and a second roller bearing spaced beneath said mounting bar and adapted to contact said mounting bar enabling the operator to exert cutting pressure when either of said handles are raised or depressed to tilt said carriage.

8. A cutting machine as defined in claim 7 wherein a set screw is mounted on the carriage above the mounting bar and is turnable into engagement therewith, and thereafter further turnable to raise the carriage until both of the roller bearings engage the undersurface of the mounting bar and effect locking of the carriage in position on the mounting bar.

9. A cutting machine for rolled sheet material comprising, in combination:
    a frame including a support for a roll of sheet material and a shelf and wear plate adjacent said roll support for supporting sheet material unwound from said roll;
    a mounting bar carried by said frame, fixed against upward movement and positioned in parallel spaced relation with and extending transversely across said wear plate from one side of the frame to the other;
    a carriage manually reciprocable along said mounting bar, said carriage including
        a cutter on the underside of said carriage engaging said wear plate for cutting said sheet material when interposed therebetween,
        an operating handle attached to the upper portion thereof and providing a lever arm extending generally parallel to said mounting bar toward one side of the frame for both manually moving the carriage and applying cutting pressure, and a roller bearing beneath and spaced from said mounting bar so that said carriage and cutter may be bodily raised to permit introduction and passage of material unwound from the roll between the cutter and wear plate, and positioned on the same side of said cutter as said handle to be raised upwardly by reaction against the cutter from said wear plate and into contact with said fixed mounting bar when an operator lifts upwardly on said operating handle to tilt said carriage thereby enabling the operator to exert concentrated cutting pressure against said sheet material interposed between said cutter and wear plate while moving the carriage.

* * * * *